No. 678,584. Patented July 16, 1901.
D. O. PAIGE.
APPARATUS FOR RACKING BEER.
(Application filed Jan. 28, 1898.)
(No Model.) 7 Sheets—Sheet 4.

WITNESSES:
L. C. Hills.
S. E. Zimmerman

INVENTOR:
David O. Paige
BY Dyrenforth, Dyrenforth & Lee
Attorneys

No. 678,584. Patented July 16, 1901.
D. O. PAIGE.
APPARATUS FOR RACKING BEER.
(Application filed Jan. 28, 1898.)
(No Model.) 7 Sheets—Sheet 5.

WITNESSES:
L. C. Hills
S. E. Zimmerman

INVENTOR:
David O. Paige,
BY Dyrenforth Dyrenforth + Lee
Attorneys

No. 678,584. Patented July 16, 1901.
D. O. PAIGE.
APPARATUS FOR RACKING BEER.
(Application filed Jan. 28, 1898.)
(No Model.) 7 Sheets—Sheet 6.

WITNESSES:
L. C. Hills
S. E. Zimmerman

INVENTOR:
David O. Paige,
BY Dyrenforth, Dyrenforth &Lee
Attorneys

No. 678,584. Patented July 16, 1901.
D. O. PAIGE.
APPARATUS FOR RACKING BEER.
(Application filed Jan. 28, 1898.)
(No Model.) 7 Sheets—Sheet 7.

WITNESSES:
L. C. Hills
S. E. Zimmerman

INVENTOR:
David O. Paige,
BY Dyrenforth Dyrenforth &lee
Attorneys

UNITED STATES PATENT OFFICE.

DAVID O. PAIGE, OF DETROIT, MICHIGAN.

APPARATUS FOR RACKING BEER.

SPECIFICATION forming part of Letters Patent No. 678,584, dated July 16, 1901.

Application filed January 28, 1898. Serial No. 668,293. (No model.)

*To all whom it may concern:*

Be it known that I, DAVID O. PAIGE, a citizen of the United States, residing at Detroit, in the county of Wayne and State of Michigan, have invented certain new and useful Improvements in Apparatus for Racking Beer; and I do hereby declare the following to be a full, clear, and exact description of the invention, such as will enable others skilled in the art to which it appertains to make and use the same.

This invention relates to appliances for racking carbonated liquids, and contemplates the production of a new and improved racking apparatus by the operation of which the liquid is rapidly packaged without waste and without diminution of pressure or escape of gas.

The nature of the invention will be readily comprehended, reference being had to the following detailed description and to the accompanying drawings, in which—

Figure 6:
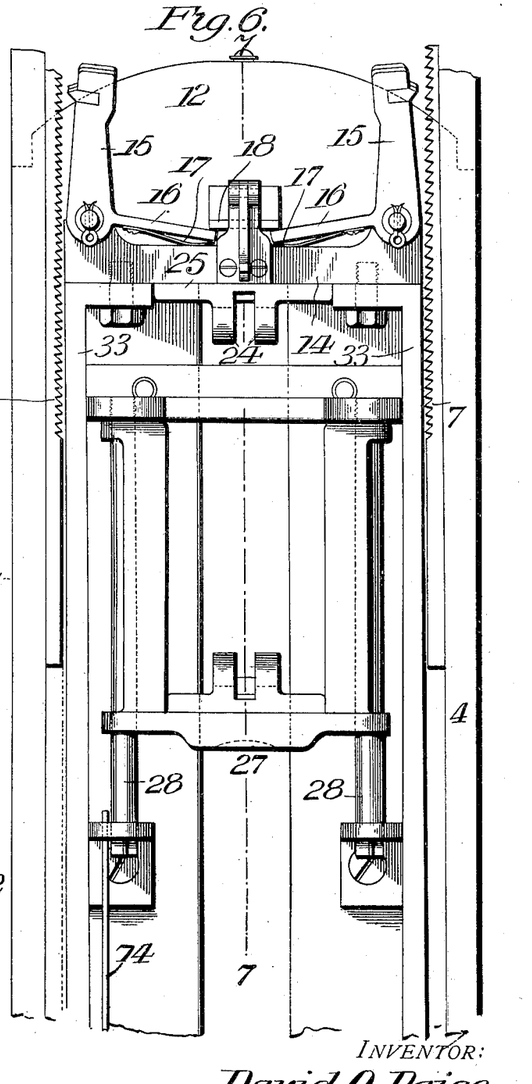
Fig. 6 is an enlarged view in elevation showing the means for locking the movable frame while the bung is being driven.
Figures 7, 8:
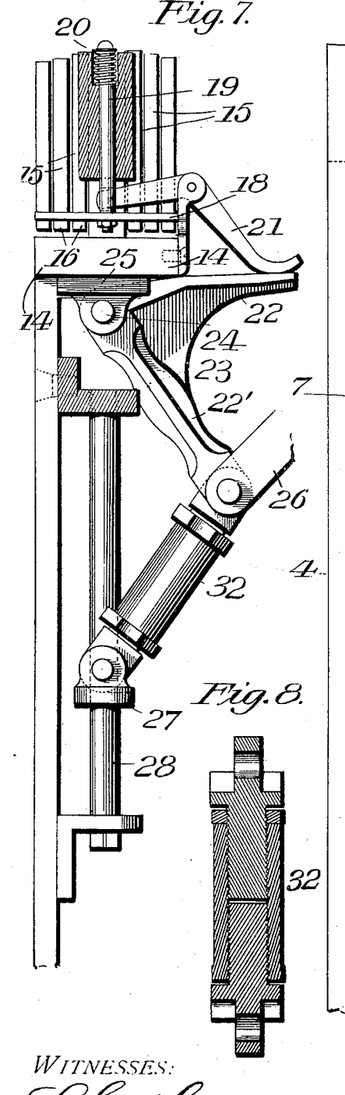
Fig. 7 is a vertical sectional view on line 7 7 of Fig. 6.
Fig. 8 is a detail sectional view of a turnbuckle connection by the adjustment of which the driving of the bung is regulated.

Referring to the said drawings by numerals, 1 denotes a base-plate having extensions or legs 2 2. Erected at the ends of the base-plate are standards 3 3, which toward their upper ends extend inwardly, providing an arch-like support for two uprights 4 4, which are connected at their upper ends by a yoke-piece 5. These frame members are bolted or otherwise firmly fastened together. Each of the uprights is provided with a vertical guide-slot 6, extending from about midway of the height of the upright to near the upper end thereof, and flanking the guide-slot at the inner side of each upright are rack-bars 7 7, the lower tooth-faces of which approximate right angles to the upright. In the inner side of each upright is a vertical guide-groove 8 of V form in cross-section. Mounted on the lower end of each upright and at the outer side thereof is a fluid-cylinder 9, in which is confined a vertically-reciprocating piston 10, to which is attached a piston-rod 11, extending through and considerably beyond the upper cylinder-head. The upper ends of the piston-rods 10 are firmly bolted or otherwise secured to the outer ends of a cross-head 12, which is vertically movable in the guide-slots 6 and which is provided near each end with guide-shoulders 13 in sliding contact with the outer side or face of the upright, whereby endwise movement of the cross-head is prevented. At the lower side of the cross-head are flanges 14 14, and pivoted to the cross-head above the flanges are a plurality of locking-dogs 15 15, which are adapted to be brought into engagement with the rack-bars for a purpose presently to be explained. The dogs are twelve in number, though a greater or less number may be provided, and said dogs are arranged in sets of three, there being a set for each of the four rack-bars 7. To insure immediate and positive locking of the cross-head when the latter is in proper position, as hereinafter described, the engaging points of the dogs of each set are arranged in different planes or are stepped, (see more particularly Figs. 6 and 7,) whereby one of the dogs at each end of the cross-head is always positioned to engage a tooth on its respective rack-bar without lost motion. To further insure proper locking engagement, the dogs of one set are arranged in planes varying slightly from the planes of the dogs of the set on the opposite side of the cross-head, and thus the six dogs at each end of the latter have their engaging points in six different planes. Each dog has a diagonally opposite companion dog in the same plane, whereby the strain upon the locked cross-head is evenly distributed. Each of the dogs 15 is provided toward its lower end with an inwardly-extending arm 16, and secured to the under side of each arm is a spring 17, the free end of which bears against the flange 14 and tends to move the point of the dog into engagement with the respective rack-bar. The dogs are all normally held in disengaged position against the action of the springs 17 by a plate 18, which is vertically movable in an opening in the cross-head to bear on the ends of the arms 16 and which is guided by a rod 19, reciprocably confined in a vertical aperture in said head and normally depressed to disengage the dogs against the action of the springs 17 and a spring 20, coiled around the upper end of the guide-rod 19 between shoulders on the rod and cross-head. Pivoted centrally on the cross-head is a trip-lever 21, the inner end of which occupies a slot in the rod 19, while the outer end extends into the path of one arm 22 of a bell-crank lever 23, pivotally connected to apertured lugs 24, carried by a plate 25, said plate being secured to the under side of the cross-head. The other arm 22' of the lever 23 is pivoted to an arm 26, and said latter arm is pivotally connected at its lower end to a head 27, which is actuated to exert pressure on the filling-tube to drive the bung, as will presently appear. The head is vertically movable on guide-rods 28 28. The upper end of the arm 26 is connected to the rod 29 of a piston 30, reciprocably confined in a cylinder 31, secured to the upper portion of the frame. The piston 30 is fluid-actuated in a manner hereinafter described to depress, through the described connections, head 27 to drive the bung, and to regulate the extent to which the bung is driven the arm 26 is provided toward its lower end with a turnbuckle 32, by which the length of the arm, and consequently the range of movement of the head 27, may be varied. The downward movement of the piston 30, in addition to actuating the bung-driving head, effects the release of the trip-lever 21 and the dogs 15, the latter being thus free to engage the rack-bars and lock the cross-head 12 during the bung-driving operation. In the upward movement of the piston 30 the bung-driving head is elevated and the bell-crank-lever is moved to engage the trip-lever and effect the disengagement of the dogs from the rack-bars.

33 33 denote bars which are secured at their upper ends to the under side of the cross-head, and which in the normal position of the parts extend to the lower ends or thereabout of the uprights 4 4. The bars 33 are movable with the cross-head, being guided by the engagement of tongues 34 thereon with the grooves 8 of the uprights. Secured to the lower ends of the bars 33 is a filling-head 35, consisting of a casing 36, having a central chamber 37, from which extends laterally a bung-recess 38 and also an aperture 39, the purpose of which will presently appear.

Figure 4:
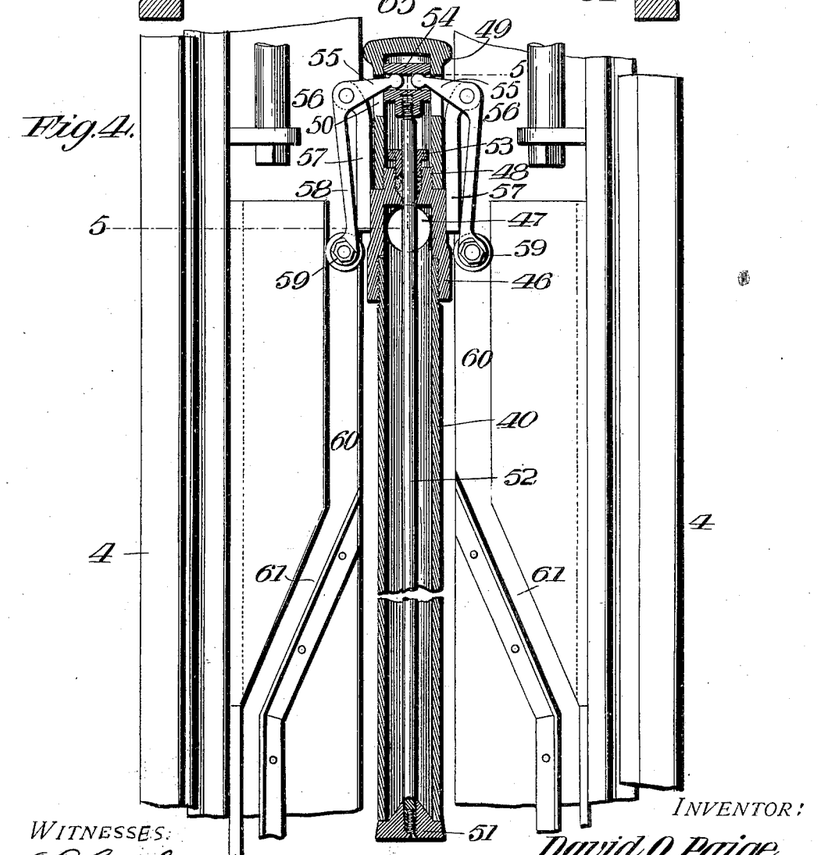
Fig. 4 is an enlarged longitudinal sectional view of the filling-tube, showing part of the frame in elevation.
Figure 5:
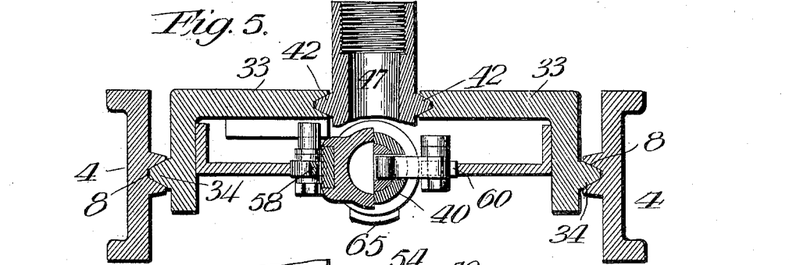
Fig. 5 is a horizontal sectional view on line 5 5 of Fig. 4.

40 denotes the filling-tube, which is secured at its upper end to a bracket 41, having V-shaped tongues 42, slidably engaging corresponding grooves in the bars 33. The lower end of the filling-tube is vertically slidable through the filling-head, the latter being provided at its upper side with an extension 43, serving as a guide for the tube, and 44 is a recessed nut forming, with the extension and with an inner sleeve 45 and a suitable packing, a stuffing-box to prevent leakage around the tube. At the upper end of the filling-tube is a cap 46, having a lateral opening 47, which forms the liquid-inlet to the tube and which is connected with the liquid-supplier. The cap 46 has at its upper end a reduced threaded portion 48, to which is secured a cap-shaped head 49, having slots 50 below its closed upper end.

51 is a valve normally closing the lower or outlet end of the filling-tube. The valve at its upper side is of conical form, whereby it is self-centering and in its closed position, the valve-shoulders against the end of the tube, the contacting surfaces being formed to insure against leakage. The filling-tube serves also as the direct means by which the bung is driven. To this end the under side of the valve is plain, and said valve and tube are sufficiently heavy to bear the strain to which they are subjected. The combined valve and head is carried by a stem 52, which extends through and beyond the cap 46, the latter being centrally apertured to receive the stem and having a stuffing-box 53 to provide a tight joint at the aperture. Secured to the upper end of the stem is a block 54, which is slidably confined in the head 49. The block is apertured or recessed to receive arms 55 55 of bell-crank levers 56 56, pivoted to brackets 57, carried by the cap 46. The other lever-arms 58 58 carry at their ends friction-rollers 59, which engage fixed cam-grooves 60, provided at the sides of the filling-tube. The grooves 60 for a portion of their length are parallel to the filling-tube and during a portion of the traverse of the tube the levers 56 are idle. When, however, the lower lever ends engage inclined portions 61 of the grooves, the levers are rocked, and through their connection with the valve-stem 52 the valve 51 is lowered and the filling-tube opened to deliver liquid. Below the inclined portions 61 the grooves are in parallelism, so that the filling-tube is permitted a range of movement with the valve unseated, as well as a traverse with the valve seated.

The filling-tube is moved through rod connection with a fluid-actuated piston 62, reciprocably confined in a cylinder 63, supported on the frame opposite to the cylinder 31. The piston-rod 64 is bolted or otherwise secured directly to the bracket 41, which carries the filling-tube. On the cap 46 of the filling-tube is a shoulder or lug 65, and pivoted to the frame is a stop-lever 66, the upper end of which is in the path of the shoulder 65. As will presently more clearly appear, the stop-lever operates to temporarily check the downward movement of the filling-tube after the latter has reached a predetermined position, and said stop-lever is then moved by hand to release the tube and permit it to complete its traverse, the limit of movement being reached when a stop 67 on the cap 46 engages a buffer-stop 68 on the frame.

Figure 1:
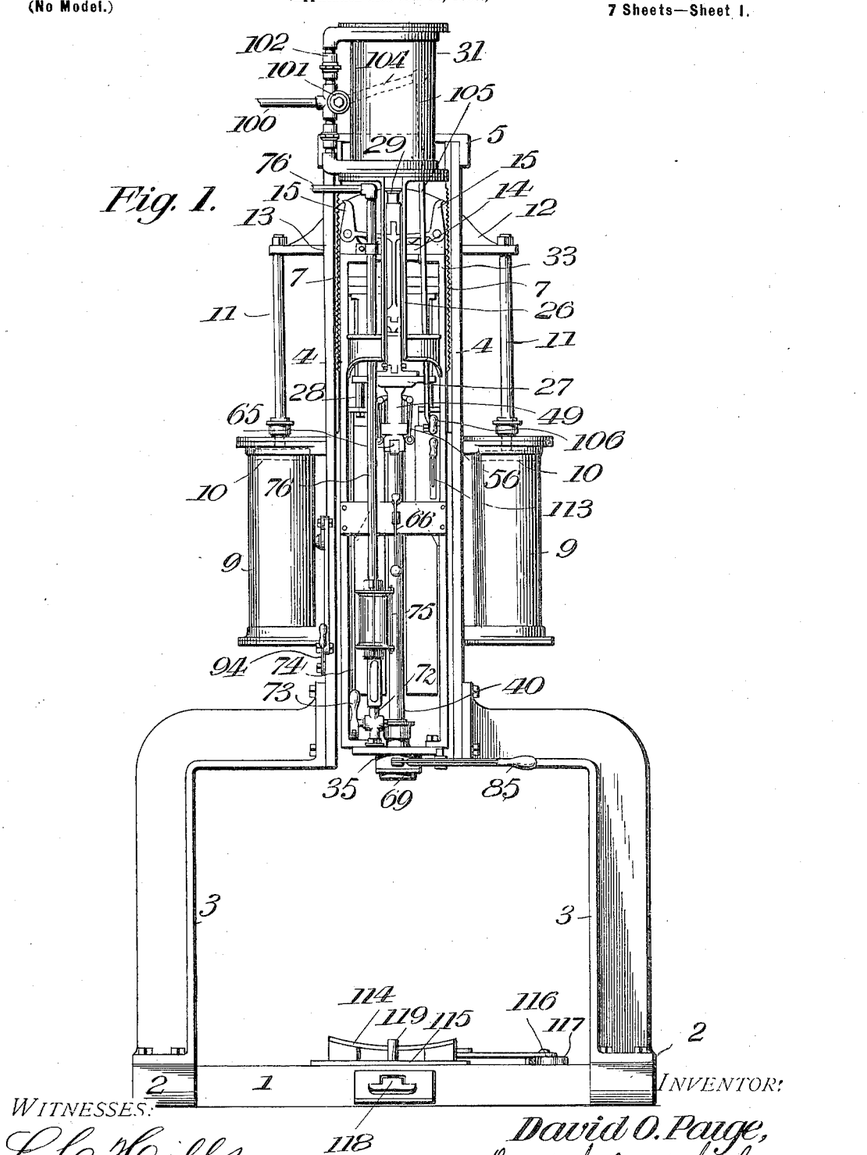
Figure 1 is a front elevation of a racking apparatus embodying my invention.
Figure 2:
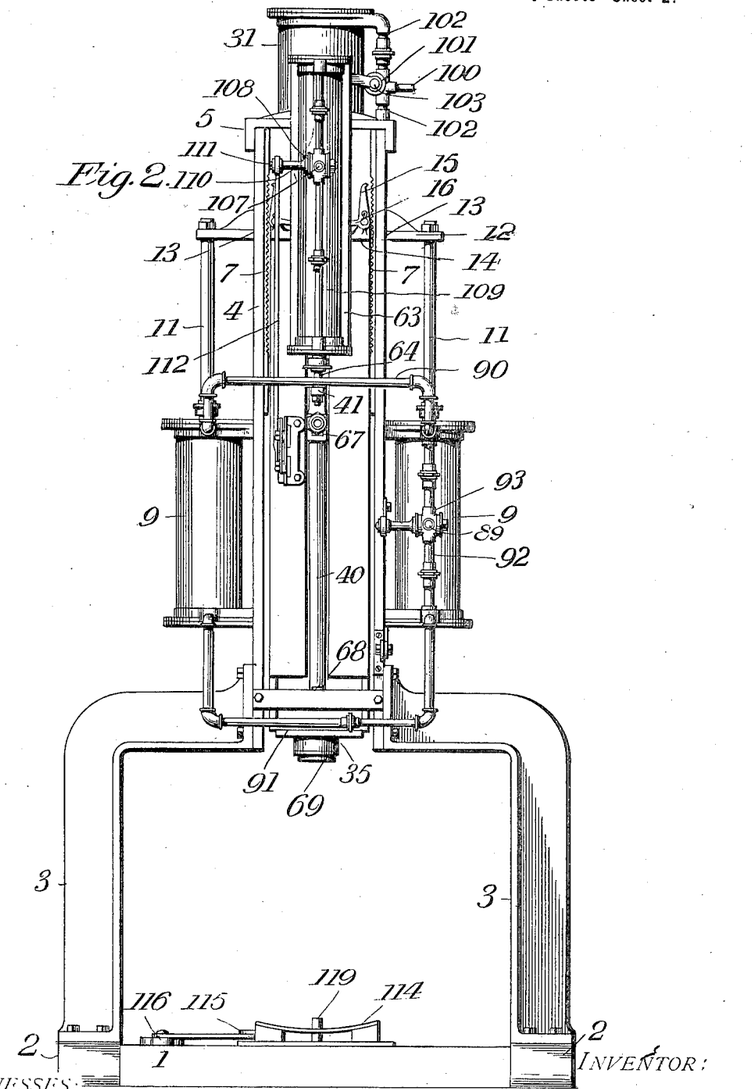
Fig. 2 is a rear elevation of the same.
Figures 3, 9:
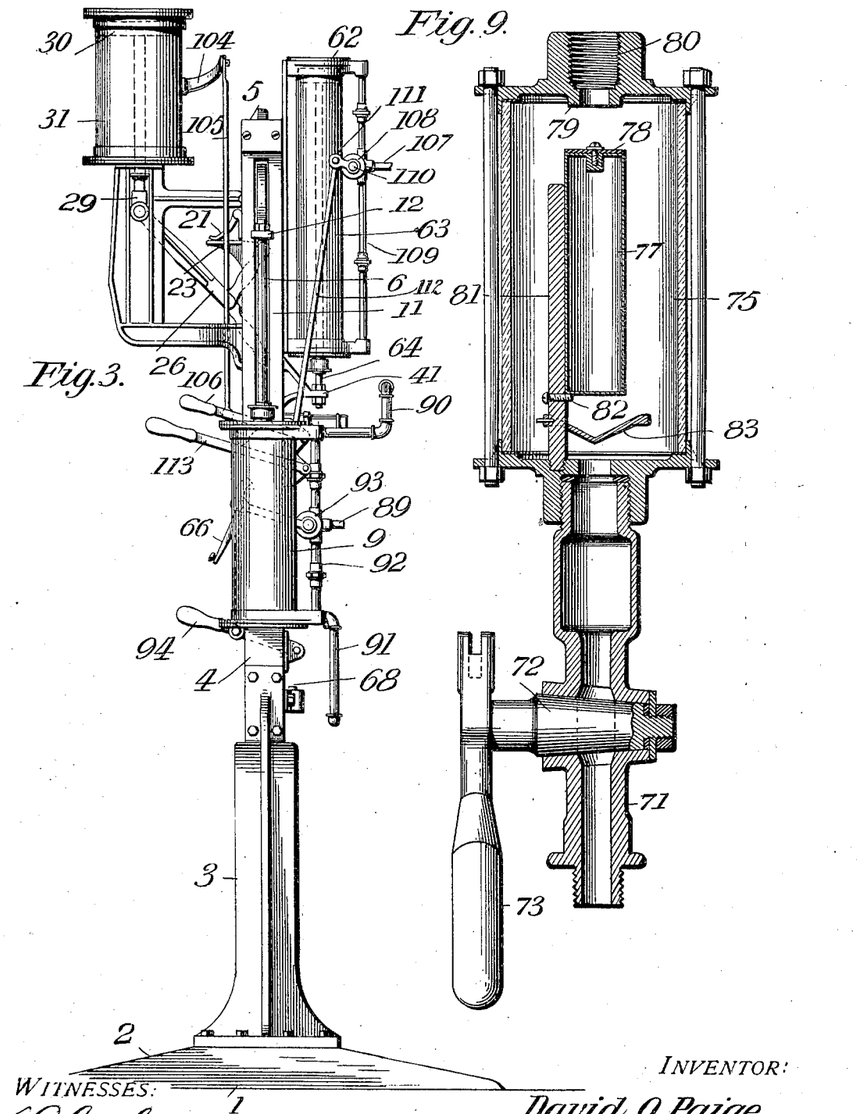
Fig. 3 is a side elevation of the same.
Fig. 9 is a detail view of a sight-glass and back-pressure float-valve.
Figure 14:
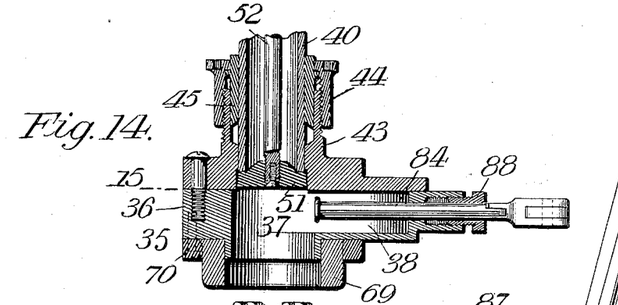
Fig. 14 is a vertical sectional view of the filling-head and the lower end of the filling-tube.
Figure 15:
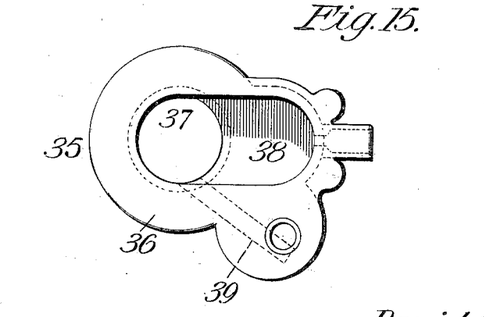
Fig. 15 is a sectional view on line 15 of Fig. 14.

The filling-head chamber 37, through which the filling-tube moves, is open at its lower side, and around such opening is a rubber or other gasket 69, which when the head is lowered is compressed around the bung-hole of the package and forms, with the package, a tight seal against the escape of back air-pressure, the gas in the liquid, and liquid leakage. The gasket is held to place by a ring 70, bolted to the head-casing 36. Secured to the aperture 39 of the filling-head casing is a pipe 71, in which is a valve 72, having fixed to its stem a hand-lever 73. A rod 74 is pivotally connected at its lower end to the lever 73, and the upper end of the rod is arranged in the path of bung-driving head 27. A sight-glass 75 is connected at its lower end to the pipe 71 and at its upper end to a pipe 76, leading to the back-pressure tank. (Not shown.) The valve 72 controls the admission of the back air-pressure to the package and also the admission of the liquid to the sight-glass 75 after the package has become filled. In the sight-glass is a float 77, which is raised by the liquid entering the sight-glass to bring its upper end 78, which constitutes a valve, against a valve-seat 79 at the opening 80 in the upper end of the sight-glass, to which opening the back-pressure pipe 76 is connected. When the opening 80 is closed by the elevation of the float, the ingress of liquid in the package ceases, as will be understood. The float is guided by vertical rods 81, which form a cage therefor, and on one of the rods is a stop 82 to limit the downward movement of the float.

83 denotes an inverted-cone-shaped deflector interposed between the liquid-inlet of the sight-glass and the float to shield the latter from the impact of the incoming liquid.

Figure 13:
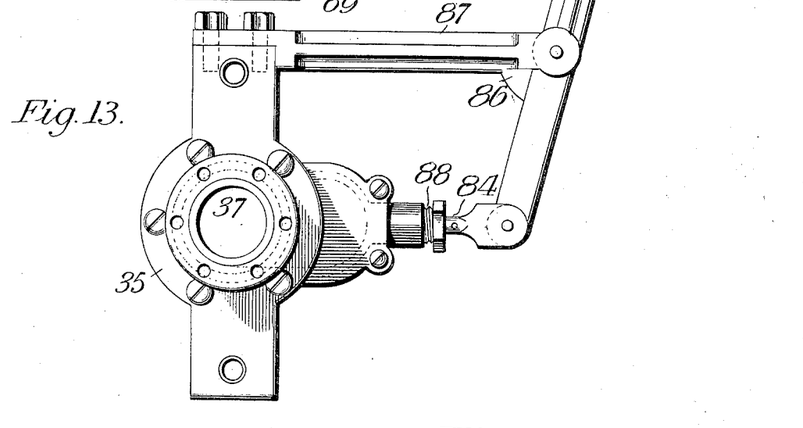
Fig. 13 is a plan view of the filling-head.

The bungs are inserted singly by hand in the recess 38 of the filling-head through the opening of the chamber 37. A rod 84 is operated by a hand-lever 85 to move the bung into position, the movement being limited by a stop 86 on the arm 87, which supports the lever.

88 is a stuffing-box forming a tight joint around the rod 84.

Figure 10:
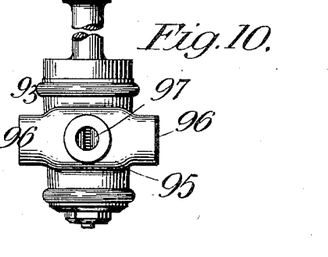
Fig. 10 is an elevation of one of the valves.
Figure 11:
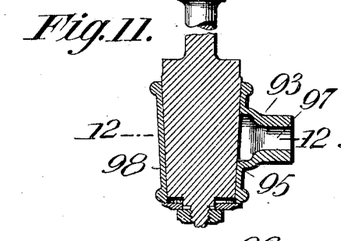
Fig. 11 is a longitudinal sectional view of the same.
Figure 12:
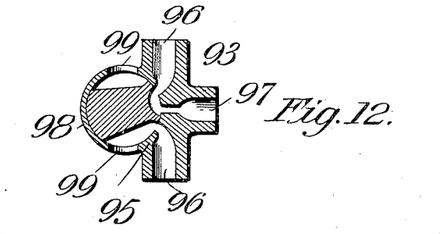
Fig. 12 is a cross-sectional view on line 12 12 of Fig. 11.

The cylinders 9 9 are supplied with fluid under pressure from a pipe 89, leading from a compressed-fluid supplier. The upper ports of the cylinders are connected by a pipe 90 and the lower ports by a pipe 91, and connecting the upper and lower ports of one of the cylinders is a pipe 92, in which is a valve 93, to the stem of which is connected a hand-lever 94. Movement of the lever controls the admission of fluid above and below the pistons, and the connections between the cylinders are proportioned to secure the admission of fluid simultaneously to both of the upper or both the lower ports, dependent upon the desired direction of the pistons. The valve 93 is of the rotary type and is confined in a casing 95. The casing is provided with openings 96 96, to which are connected sections of the pipe 92, and an opening 97, to which is led the fluid-supply pipe 89. The valve is immediately confined in a cylindrical portion 98, which has openings 99 99, forming exhaust-outlets. In one position of the valve the fluid is conducted to the upper ports of the cylinders to move the pistons downwardly, and in this position the fluid below the pistons exhausts through the lower opening 99. In the other position of the valve the fluid is conducted to the lower ports of the cylinders to elevate the pistons, the fluid above the pistons exhausting through the upper opening 99.

Fluid under pressure is supplied to the cylinder 31 from a pipe 100, which leads to a three-way valve 101 of similar construction to the valve 93, the valve being let in a pipe 102, connecting the upper and lower ports of the cylinder. To the stem 103 of this valve is attached one end of an arm 104, and 105 is a rod connecting the other end of the arm with a hand-lever 106, pivoted to the frame within easy reach of the operator.

The cylinder 63 is supplied with compressed fluid from a pipe 107, which is connected with a three-way valve 108, let in a pipe 109, connecting the upper and lower ports of the cylinder. The valve is similar in construction to the valves 93 and 101, and to the stem 110 of said valve is fixed an arm 111, connected by a rod 112 to a hand-lever 113, which is pivoted to the frame at a point below and close to the hand-lever 106.

Figures 16, 17:
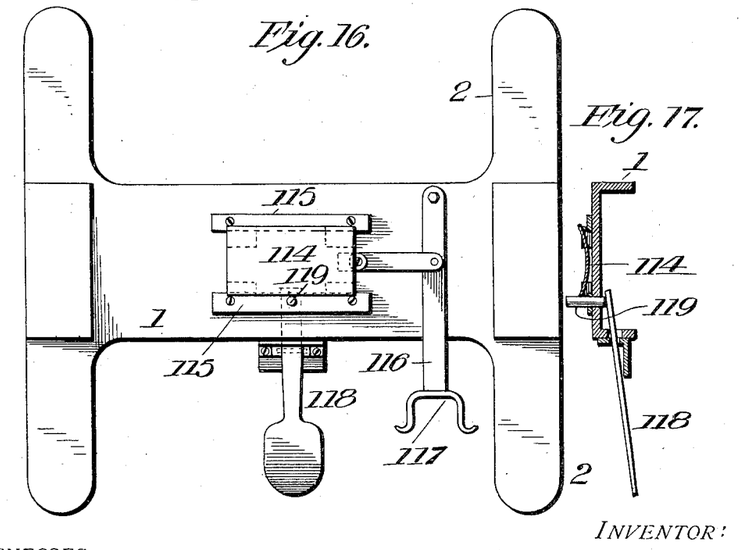
Figs. 16 and 17 are respectively plan and sectional views of the base and the means employed for supporting, positioning, and removing the package.

The package to be filled is placed on a table 114, which is slidable along guide-bars 115, secured to the base 1, to bring the bung-hole of the package in alinement with the filling-tube, the table and package being moved through rod connection with a pivoted lever 116, having at its outer end a stirrup 117 to be engaged by the leg of the operator. The filled and bunged package is removed from the table by depressing a foot-lever 118, pivoted to the frame-base, which lever elevates a slidable pin 119 to tilt the package, and thereby force it from the table-support.

In operation the package is placed on the table-support 114, with the bung-hole uppermost, and the table is moved to bring the bung-hole into vertical alinement with the filling-tube. The lever 113 is then depressed, and compressed fluid is admitted above the piston in cylinder 63, thereby imparting a downward movement to said piston and the filling-tube until the stop or shoulder 65 on the latter engages the stop-lever 66. At this stage of the operation the filling-tube extends below the filling-head, and thus the operator is enabled to readily center the package. The lever 94 is then depressed, and fluid under pressure is admitted above the pistons in the cylinders 9. The pistons moving downwardly carry with them the cross-head and the filling-head, and the latter is pressed against the package, the gasket encircling the bung-hole and forming a tight seal. The lever 73 is now depressed to admit air from the back-pressure tank to the package, and in such movement of the lever the upper end of the rod 74 is brought into the path of the bung-driving head 27. Sufficient time having been allowed for the package to become filled from the back-pressure tank, the stop-lever 66 is depressed to release the filling-tube, and said tube continues its downward movement until stopped by the engagement of the stops 67 and 68. As the tube moves downwardly in the package the levers 56 are rocked by engagement with the cam-grooves 61, and through connection with the valve-stem 52 the valve 51 is lowered from its seat and the liquid is admitted to the package, displacing the air from the back-pressure tank. When the package has become filled, the liquid rises in the sight-glass until the float is elevated to close the opening 80, when the ingress of liquid into the package ceases. The lever 113 is now elevated, and fluid being supplied to the under side of the piston of cylinder 63 the filling-tube is raised to a point in the filling-head above the bung-recess. The lever 85 is now moved to bring the bung into position over the bung-hole, after which the levers 113 and 106 are together depressed to admit fluid simultaneously above the pistons in cylinders 63 and 31, with the result that the filling-tube is subjected to the double pressure from the two pistons to drive the bung. In the downward movement of the piston of cylinder 31 the dogs 15 are released, and certain of the dogs instantly engage without lost motion diagonally opposite rack-bars 7, the result being that the cross-head is firmly locked against the pressure exerted by the piston of cylinder 31 to drive the bung. The piston of cylinder 31 operates through the head 27 to exert the pressure against the filling-tube to drive the bung. In the downward movement of said head the upper end of the rod 74 is engaged thereby, and said rod being depressed the valve 72 is turned to close the passage to the back-pressure tank. After the bung is driven the levers 94, 106, and 113 are elevated, and the parts are thereby restored to their normal positions. Lastly, the filled and bunged package is thrown from the table, and the apparatus is then ready for the next operation.

I claim as my invention—

1. In a racker, the combination with the main frame, of a fluid-actuated frame slidably mounted on the main frame, a filling-head carried by the movable frame, a filling and bung-driving tube slidably mounted on the movable frame, fluid-pressure means for moving the tube, and separate fluid-pressure means coöperating with the aforesaid fluid-pressure means against the tube to drive the bung.

2. In a racker, the combination with the main frame, of a frame slidably mounted on the main frame, means for moving the slidable frame, a filling and bung-driving tube movable on the slidable frame, means operating against the tube to drive the bung, and means independent of the frame-moving means for locking said frame during the bung-driving operation.

3. In a racker, a fluid-actuated vertically-movable filling and bung-driving tube, and means coöperating with the fluid-pressure means against the tube to drive the bung, said means being adjustable to regulate the extent to which the bung is driven.

4. In a racker, a filling and bung-driving tube, fluid-pressure means for moving the tube relative to the package and to drive the bung, and separate fluid-pressure means operating against the tube to augment the pressure simultaneously exerted by the first-named means to drive the bung.

5. In a racker, the combination with the main frame, of a frame slidably mounted on the main frame, fluid-pressure means for moving the slidable frame, a filling and bung-driving tube movable on the slidable frame, fluid-pressure means operating against the tube to drive the bung, and means independent of the frame-moving means for locking without lost motion the slidable frame during the bung-driving operation.

6. In a racker, the combination with the main frame, of a movable frame, a bung-driver, and a plurality of locking devices arranged in different planes on the movable frame to engage shoulders on the main frame during the bung-driving operation.

7. In a racker, the combination with the main frame carrying rack-bars, of a movable frame, a bung-driver, and a plurality of locking-dogs on the movable frame the points of the dogs being arranged in different planes to engage the rack-bars without lost motion.

8. In a racker, the combination with the main frame having guides, of rack-bars adjacent to said guides, a frame movable in said guides, a bung-driver, and a plurality of sets of locking-dogs carried by the movable frame, the dogs of each set being arranged in different planes to engage the rack-bars without lost motion.

9. In a racker, the combination with the main frame carrying rack-bars, of a frame slidably movable on the main frame, a bung-driver, locking-dogs on the movable frame normally disengaged from the rack-bars, and means for releasing the dogs to engage the rack-bars and for thereafter operating against the bung-driver.

10. In a racker, the combination with the main frame carrying rack-bars, of a frame slidably movable on the main frame, a bung-driver, spring-pressed locking-dogs on the movable frame, a head operating against the bung-driver, and means for actuating the head and for restraining and releasing the dogs.

11. In a racker, the combination with the main frame carrying rack-bars, of a frame slidably movable on the main frame, a bung-driver, spring-pressed dogs on the movable frame, a head operating against the bung-driver, an arm between the bung-driver and a power device, and means operatively connected with the arm, to restrain the dogs previous to the bung-driving operation, and to release the dogs and permit engagement thereof with the rack-bars during such bung-driving operation.

12. In a racker, the combination with the main frame carrying rack-bars, of a frame movable on the main frame, a bung-driver, spring-pressed dogs on the movable frame having arms, a head operating against the bung-driver, an adjustable arm connecting the head with a fluid-actuated piston, a bell-crank lever connected to the power-lever, and a trip-lever adapted to be moved by the bell-crank lever to engage the dog-arms and restrain the dogs.

13. In a racker, the combination with a filling-head, of a filling-tube slidable through the head, a vertically-moving plug-valve at the lower end of the tube, a valve-stem extending through and beyond the upper end of the tube, and bell-crank levers connected at one end to the projecting end of the stem, and carrying at their other end rollers which are confined in cam-grooves.

14. In a racker, a filling-head having a filling-chamber, a pipe connecting the chamber with the back-pressure tank, a valve in the pipe, and a rod connected with the valve and extending into the path of a movable part of the apparatus to be moved thereby for controlling said valve.

15. In a racker, the combination of a filling-head, means for moving said head, a filling-tube, means for moving said tube, and a catch operating to temporarily check the downward movement of the tube for the purpose set forth.

16. In a racker, the combination of a vertically-movable filling-head, a vertically-movable filling-tube, a catch operating to temporarily check the downward movement of the filling-tube, and a stop to limit the downward movement of said tube.

In testimony whereof I affix my signature in presence of two witnesses.

DAVID O. PAIGE.

Witnesses:
T. O'LEARY,
LOUIS F. DILLMANN.